2 Sheets—Sheet 1.

J. S. HARBISON.

Bee-Hive

No. { 121. / 1,225. }

Reissued Sept. 3. 1861.

Witnesses

S. N. Wales

W. Buckley

Inventor:

John S. Harbison

N. PETERS, PHOTO-LITHOGRAPHER, WASHINGTON, D. C.

BEST AVAILABLE

2 Sheets—Sheet 2.

J. S. HARBISON.

Bee-Hive.

No. { 121. / 1,225. }

Reissued Sept. 3, 1861.

Witnesses:

S. V. Wales

R. Buckley

Inventor:

John S. Harbison

N. PETERS, PHOTO-LITHOGRAPHER, WASHINGTON, D. C.

BEST AVAILABLE COPY

UNITED STATES PATENT OFFICE.

J. S. HARBISON, OF SACRAMENTO, CALIFORNIA.

IMPROVEMENT IN BEE-HIVES.

Specification forming part of Letters Patent No. 22,500, dated January 4, 1859; Reissue No. 1,225, dated September 3, 1861.

*To all whom it may concern:*

Be it known that I, JOHN S. HARBISON, of Sacramento, in the county of Sacramento and State of California, have invented a new and useful Improvement in Bee-Hives; and I do hereby declare that the following is a full, clear, and exact description of the same, reference being had to the accompanying drawings, forming a part of this specification, in which—

Figures 1, 2:
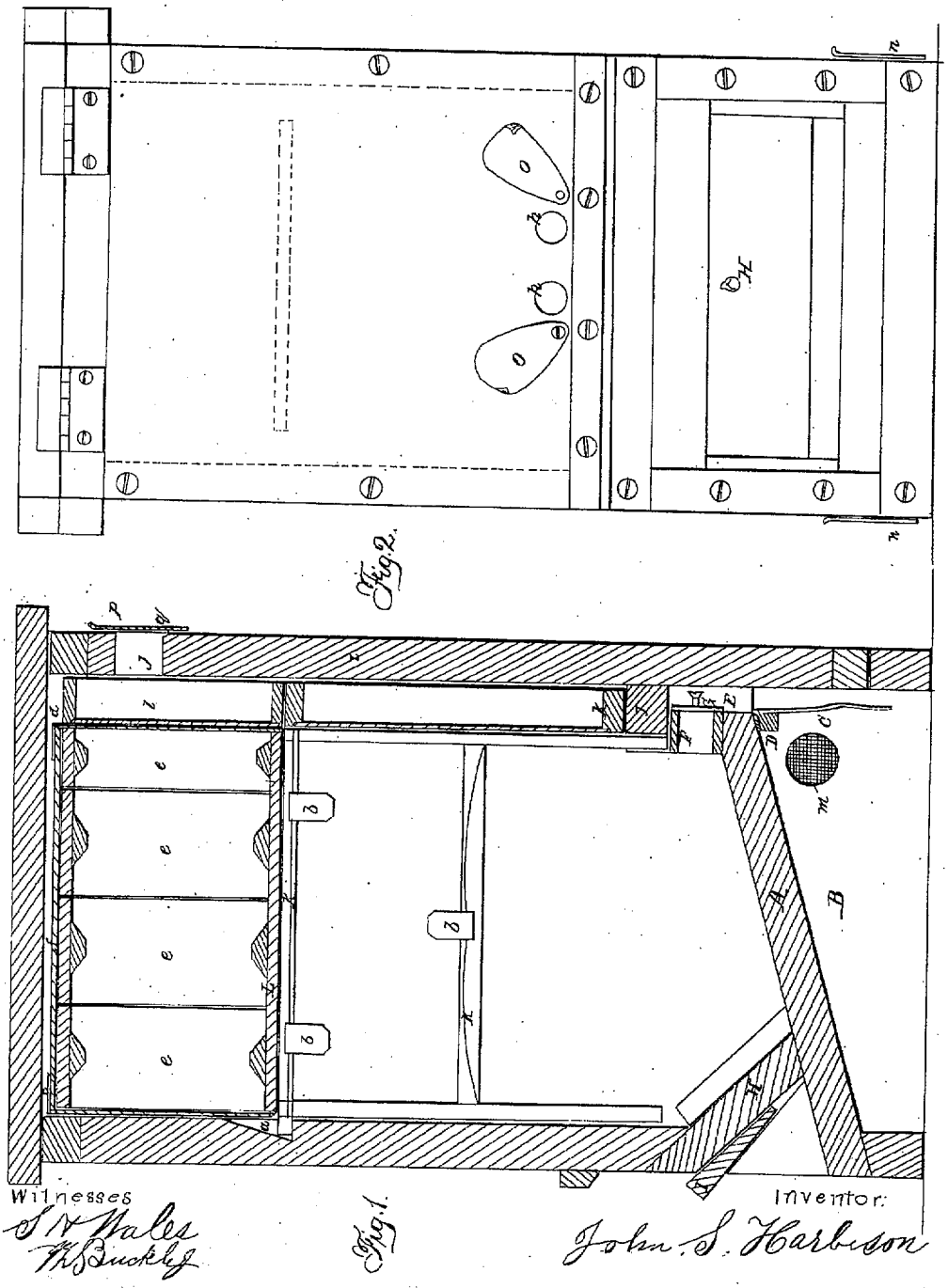
Figure 4:
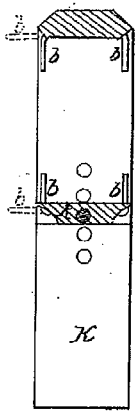
Figure 5:
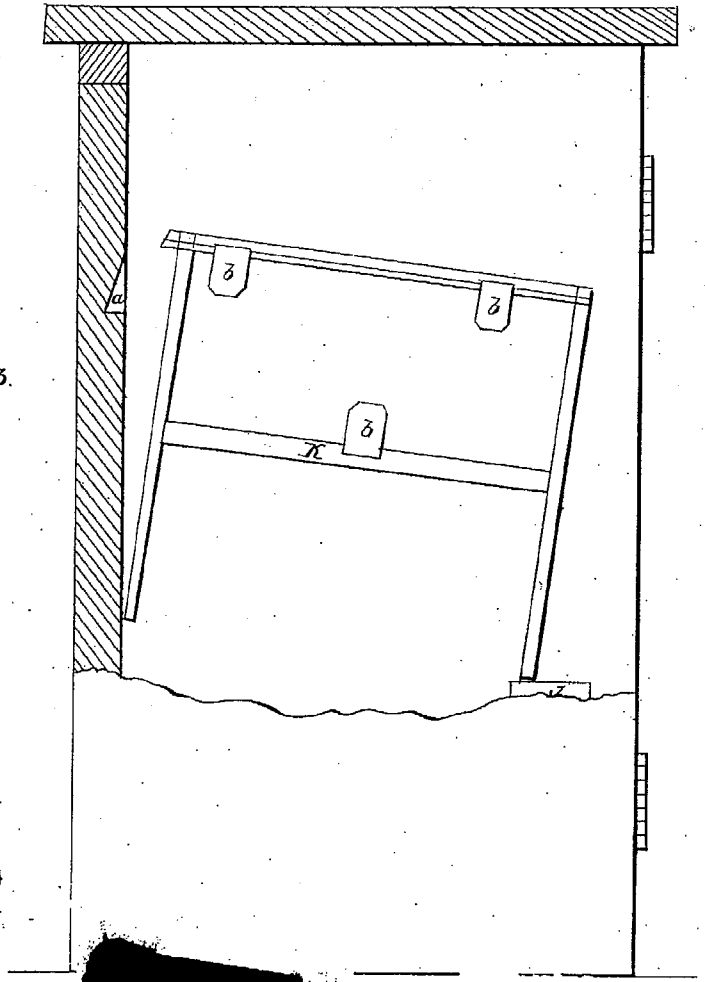

Figure 1 represents a longitudinal section of my bee-hive; Fig. 2, a front elevation of the same; Fig. 3, a longitudinal section illustrating the sectional comb-frame when being removed from the hive through the door-entrance, and Fig. 4 a vertical section of the sectional comb-frame.

Similar letters of reference in each of the several figures indicate corresponding parts.

The nature of my invention consists, first, in arranging and supporting narrow comb-frames of peculiar construction so that they may be removed through the side or door of the hive, as hereinafter described; second, in a sectional store honey-box of peculiar construction; third, in the combination of an air-chamber below the bottom of the hive, ventilation-passages, and a curtain for excluding the light from the interior of the hive, substantially as hereinafter described.

To enable others skilled in the art to make and use my invention, I will proceed to describe its construction and operation.

On one side of the outer casing of the hive [illegible] door, *i*, affording access to the interior of [illegible] same. It is provided with a wire-gauze [illegible]red ventilation-passage, *j*, said passage [illegible] graduated by a slide, and serving to ventilate the upper part of the hive. A is the inclined bottom. The filth discharge passage is closed by a slide, H, which is held in position by a wedge, I. B is a chamber below the bottom of the hive. This chamber is furnished with air by means of a wire-gauze covered hole, *m*. E F is an elbow-shaped passage leading up vertically from the chamber B and horizontally into the working-chamber G′ of the hive, as represented. The vertical portion of said passage is formed partly of a fibrous material, which can be rolled up like a curtain and thus serve for graduating the quantity of air admitted to the interior of the working-chamber. By lowering the curtain a shade will be thrown about the air-space E F without stopping the ventilation, and keep the bees in a state of repose during windy and cold weather and at those seasons of the year that they are unable to collect honey out of doors. The fibrous material forming the curtain is attached to a cross-piece secured to the inclined bottom board, A, at such a distance from the door as to allow space for the vertical portion E of the air-passage to exist. G is a movable cross-piece perforated with two holes covered with wire-gauze, for graduating the quantity of air from the chamber B or cutting it off entirely, if desirable.

K are narrow comb-frames, arranged side by side of one another in the working-chamber of the hive. These frames consist of two narrow vertical legs, *d′ d′*, a narrow bevelled top piece, *e′*, and a transverse adjustable comb-supporting strip, *f′*, as represented, and each has a tenon cut on the lower end of one of its legs, so as to fit into the mortise cut in a cross-piece, J, of the hive, and a projection formed on its top cross-piece so as to fit into a slot, *a*, cut on the inner part of the hive, as represented. The frames thus constructed are readily introduced into the hive through the door, and may be removed through the door-entrance. The lower cross-piece of the comb-frame K, being adjustable up and down by means of holes and pins, or by nailing, can be adjusted to any-sized comb that may be transferred from other hives into the frame.

In order to confine the comb securely in the frames K, as in case of transferring, flexible metal clamps *b b* are provided on the edges of the top and bottom cross-pieces of the frame. By turning down these clamps, as shown in black on Fig. 4, the comb will be confined, and by turning them up, as shown in dotted lines in the same figure, the apiarian can remove and replace a comb with facility and dispatch.

L is a platform for supporting the store honey-box P. It rests on top of the narrow comb frames K, which, being narrow, do not obstruct the passage of the bees to the store honey-box. The store honey-box is made up of narrow sections *e e e*, and said sections are united together in such manner that all or any one of them may be removed, as occasion may require. In order to secure the sections together, platform L is provided with a flexible back angular strap, *c*, and a flexible front angular strap, *d*, both of which serve to brace the sections of the store honey-box, and, together with an upper coupling-strap, *f*, fitting under the angles of the flexible angular straps and the platform L, serves to hold firmly together the sections.

By removing the coupling-strap *f* and folding down the flexible angular hinged strap *d*, the sections of store honey-box may be removed separately, and by folding the flexible angular hinged strap *d* to its former position, and replacing the coupling-strap *f*, the honey-boxes may all be removed at once, thus affording great ease and facility for reaching the sectional comb-frame K, and also allowing of the honey being removed in small or large quantities, as may be desired. When the store honey-box is removed, the narrow frames can be turned out through the door of the hive in the manner represented in Fig 3, and in their movement will be steadied and guided by the tenon and mortise, and all danger of disturbing adjoining frames thereby avoided. The slide H, being elevated a suitable distance, affords the main passage for the ingress and egress of the bees. There are additional openings *h h* provided with movable covers *o* for the same purpose. The narrow comb-frames and the store honey-box are inspected through glass frames *l*, when the door is opened.

By constructing the store honey-box, as hereinbefore explained, in sections, which are temporarily united together, one or more sections, or the whole series, may be taken from the hive at will, and the honey sold by the whole box, or narrow sections of a box, to suit the purchaser, and at the same time a frame or support in which to transport the honey is afforded at a slight additional cost.

What I claim as my invention, and desire to secure by Letters Patent, is—

1. The adjustable sectional comb-frames K, constructed and arranged and supported within the hive, as described, so that they may be readily removed through the side or door thereof, substantially as set forth.

2. A separate store honey-box in the upper portion of the hive, constructed in sections temporarily connected together, in the manner hereinbefore explained, and for the purposes specified.

3. The combination, in a bee-hive, of the air-chamber B, ventilation-passage *m*, and curtain C, substantially as and for the purposes set forth.

J. S. HARBISON.

Witnesses:

PRESLEY DUNLAP,
WM. G. ENGLISH.